(12) United States Patent
Kalgi et al.

(10) Patent No.: US 9,705,893 B2
(45) Date of Patent: **\*Jul. 11, 2017**

(54) MOBILE HUMAN CHALLENGE-RESPONSE TEST

(71) Applicant: Visa International Service Association, San Francisco, CA (US)

(72) Inventors: Avinash Kalgi, Kirkland, WA (US); Matthew Ward-Steinman, Seattle, WA (US); Qian Wang, Mercer Island, WA (US)

(73) Assignee: Visa International Service Association, San Francisco, CA (US)

( \* ) Notice: Subject to any disclaimer, the term of this patent is extended or adjusted under 35 U.S.C. 154(b) by 0 days.

This patent is subject to a terminal disclaimer.

(21) Appl. No.: 14/663,288

(22) Filed: Mar. 19, 2015

(65) Prior Publication Data

US 2015/0195289 A1 Jul. 9, 2015

Related U.S. Application Data

(63) Continuation of application No. 13/761,886, filed on Feb. 7, 2013, now Pat. No. 9,015,804.

(Continued)

(51) Int. Cl.
*G06F 7/04* (2006.01)
*H04L 29/06* (2006.01)
(Continued)

(52) U.S. Cl.
CPC ............ *H04L 63/12* (2013.01); *G06F 21/316* (2013.01); *G06F 21/36* (2013.01); *H04L 63/083* (2013.01);
(Continued)

(58) Field of Classification Search
CPC ... H04L 63/12; H04L 63/083; H04L 63/0876; H04L 63/0838; H04W 12/10; G06F 21/316; G06F 21/36
(Continued)

(56) References Cited

U.S. PATENT DOCUMENTS 6,195,698 B1 2/2001 Lillibridge et al.
7,139,916 B2 11/2006 Billingsley et al.
(Continued)

FOREIGN PATENT DOCUMENTS

WO WO 0018162 A1 \* 3/2000 ........... G06F 21/445
WO 2010/149838 A1 12/2010

OTHER PUBLICATIONS

Extended European Search Report dated Sep. 2, 2015 for EP Application No. 13746714.8, 7 pages.
(Continued)

*Primary Examiner* — Mohammad W Reza
(74) *Attorney, Agent, or Firm* — Kilpatrick Townsend & Stockton LLP

(57) ABSTRACT

Methods and systems for verifying whether a submission of a request is likely from a human user or an automated program are described. A request may be received from a user device. A human challenge-response test adapted for displaying on the user device is displayed on the user device. Upon viewing the human challenge-response test, the user enters the user's solution to the human challenge-response test on the user device. A response hash value is created based on the user's solution. The response hash value is sent to a computing device for verification.

18 Claims, 6 Drawing Sheets

Related U.S. Application Data

(60) Provisional application No. 61/595,866, filed on Feb. 7, 2012.

(51) Int. Cl.
*H04W 12/10* (2009.01)
*G06F 21/36* (2013.01)
*G06F 21/31* (2013.01)

(52) U.S. Cl.
CPC ......... *H04W 12/10* (2013.01); *H04L 63/0838* (2013.01); *H04L 63/0876* (2013.01)

(58) Field of Classification Search
USPC .............................................................. 726/5
See application file for complete search history.

(56) References Cited

U.S. PATENT DOCUMENTS

| | | | |
|---|---|---|---|
| 7,533,419 B2 | 5/2009 | Paya et al. | |
| 7,606,918 B2 | 10/2009 | Holzman et al. | |
| 7,694,335 B1* | 4/2010 | Turner | H04L 63/1441 |
| | | | 708/250 |
| 7,770,209 B2 | 8/2010 | Billingsley et al. | |
| 8,666,954 B2 | 3/2014 | Kroeger et al. | |
| 2003/0065956 A1* | 4/2003 | Belapurkar | G06F 21/41 |
| | | | 726/14 |
| 2003/0097571 A1* | 5/2003 | Hamilton | G06Q 20/00 |
| | | | 713/182 |
| 2006/0094401 A1* | 5/2006 | Eastlake, III | H04L 63/08 |
| | | | 455/411 |
| 2008/0172730 A1* | 7/2008 | Sandhu | H04L 63/06 |
| | | | 726/9 |
| 2009/0199272 A1 | 8/2009 | Gopalakrishna | |
| 2009/0235327 A1 | 9/2009 | Jakobsson et al. | |
| 2009/0249476 A1 | 10/2009 | Seacat | |
| 2009/0307765 A1 | 12/2009 | Mardikar et al. | |
| 2010/0106671 A1 | 4/2010 | Li et al. | |
| 2010/0223471 A1 | 9/2010 | Fresko et al. | |
| 2010/0318669 A1* | 12/2010 | Chugh | G06F 21/36 |
| | | | 709/229 |
| 2010/0325427 A1 | 12/2010 | Ekberg et al. | |
| 2010/0328074 A1 | 12/2010 | Johnson | |
| 2011/0071914 A1 | 3/2011 | Beasley et al. | |
| 2011/0159842 A1 | 6/2011 | Vander Veen et al. | |
| 2011/0296509 A1 | 12/2011 | Todorov | |
| 2013/0086679 A1* | 4/2013 | Beiter | H04L 63/08 |
| | | | 726/22 |
| 2013/0159195 A1 | 6/2013 | Kirillin et al. | |

OTHER PUBLICATIONS

International Search Report mailed Jun. 2, 2013 in Application No. PCT/US2013/025038.
Office Action dated Sep. 11, 2014 for U.S. Appl. No. 13/761,886, 8 pages.
Notice of Allowance dated Jan. 6, 2015 for U.S. Appl. No. 13/761,886, 7 pages.

* cited by examiner

MOBILE HUMAN CHALLENGE-RESPONSE TEST

CROSS-REFERENCES TO RELATED APPLICATIONS

This application is a continuation of U.S. patent application Ser. No. 13/761,886 filed Feb. 7, 2013, entitled "MOBILE HUMAN CHALLENGE-RESPONSE TEST," which claims priority from U.S. Provisional Patent Application No. 61/595,866, entitled "MOBILE CAPTCHA AND PIN SECURITY," filed Feb. 7, 2012, the contents of which are hereby incorporated by reference in their entireties for all purposes.

BACKGROUND

A human challenge-response test, sometimes referred to as a CAPTCHA (Completely Automated Public Turing test to tell Computers and Humans Apart) can be used to verify whether a user who is attempting to access services through the internet is human or not. A CAPTCHA is an image of one or more words that are distorted or obscured in some way. By distorting or obscuring the words, it is less likely that an automated program (e.g., an internet robot) or a machine process (e.g., optical character recognition programs) would be able to recognize and decipher the words. A user is assumed to be human if the user is able to correctly enter the words that are displayed in a CAPTCHA.

A CAPTCHA verification process can involve at least four server calls from a user device. To access an online resource, the user device sends a first server call to a web page associated with the online resource. The web page then redirects the user device to send a second server call to a CAPTCHA server to retrieve a CAPTCHA image. The user device then sends a third server call to the CAPTCHA server with a solution to the CAPTCHA image. If the user's solution is correct, the user device is then redirected again to send a fourth server call to the original web page associated with the online resource.

The use of CAPTCHA on mobile devices has been limited because of the limited display resolution available on mobile devices. Solving the CAPTCHA by a human requires visual recognition of the words by the human eye, and the limited display resolution on mobile devices makes it difficult even for the human eye to decipher the CAPTCHA. Furthermore, as described above, the use of a CAPTCHA verification process requires at least four server calls from a user device. While this may be acceptable for conventional networks that have ample communication bandwidth available, the high number of server calls for a mobile device may significantly increase the amount of time it takes to complete the verification process due to the limited bandwidth of mobile networks.

BRIEF SUMMARY

Embodiments of the present invention include systems and methods for accessing online resources. More specifically, the systems and methods described herein can be used to verify whether a user requesting an online account is likely a human. In some embodiments, a request for an online account is sent from a mobile device, and a "mobile CAPTCHA" or a human challenge-response test suitable for a mobile device is used to verify whether the user of the mobile device is likely a human or an automated program.

According to some embodiments, a user-device-side method for verifying a user requesting for an online account from a mobile device can include sending a device identifier (ID) identifying the mobile device and application data from a mobile application running on a mobile device to an account request server. The mobile device may receive request identifier and a human challenge-response test. In some embodiments, the request ID can be an application ID generated by an account request server, or a one-time key (OTK) generated by an account request server, or both. The mobile device may display the human challenge-response test on a display or screen of the mobile device for a user to solve. Upon receiving user input of a user's solution to the human challenge-response test on a user interface of the mobile device, a response hash value is generated based on the user's solution and one or more of the application ID, the device ID, and/or the OTK. The mobile device sends the request ID and the response hash value to the account request server for verification. The mobile device then receives a verification result indicating whether the request for the online account is fulfilled.

According to some embodiments, the above user-device-side method can be implemented in a mobile device including at least one processor and at least one memory storing computer readable code for executing the above method. The above user-device-side method can be, for example, embodied as a mobile application designed to run on a mobile device.

According to some embodiments, a server-side method for verifying a user for a request for an online account from a mobile device can include receiving application data from a mobile application and a device identifier (ID) identifying a mobile device. In response to receiving the application data and device ID, a request ID and a human challenge-response test can be generated and sent to the mobile device. In some embodiments, the request ID can be an application ID generated, or a one-time key (OTK), or both. A response hash value and the request ID can subsequently be received from the mobile device. A verification hash value based on a correct solution to the human challenge-response test and one or more of the application ID, the device ID, and/or the OTK can be generated to determine if the response hash value was computed based on a user's solution that is correct. The verification hash value can be generated before or after the response hash value is received. A verification result indicating whether the request for the online account is fulfilled based on the comparison of the response hash value and the verification hash value can be transmitted to the mobile device.

According to some embodiments, the above server-side method can be implemented in server computer including at least one processor and at least one memory storing computer readable code for executing the above server-side method.

DETAILED DESCRIPTION

Figure 1:
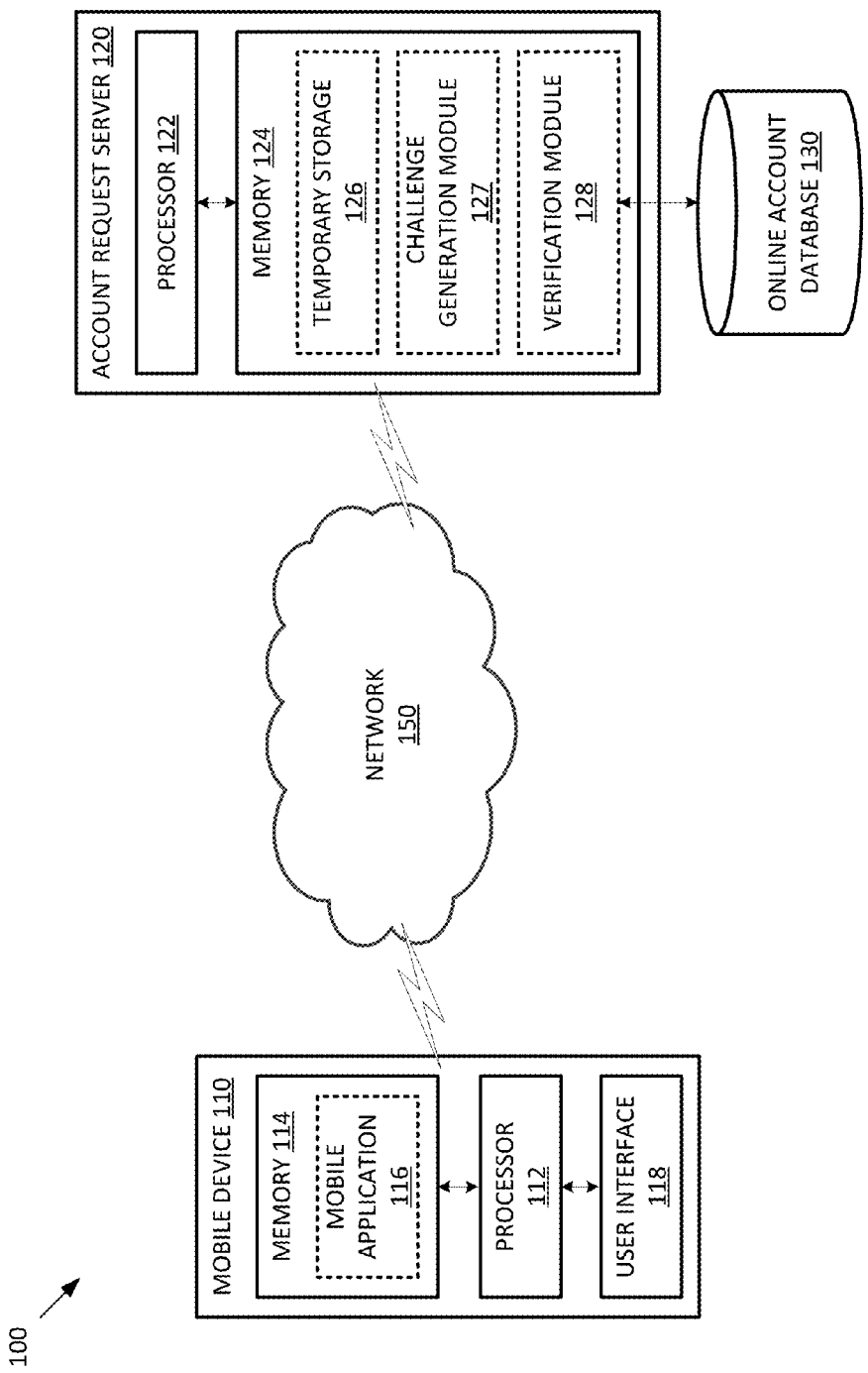
FIG. 1 illustrates an exemplary online account system, according to various embodiments.

Embodiments of the present invention include systems and methods for accessing online resources. More specifically, the systems and methods described herein can be used to verify whether a user requesting an online account is likely a human. In some embodiments, a request for an online account is sent from a mobile device, and a "mobile CAPTCHA" or a human challenge-response test suitable for a mobile device is used to verify whether the user of the mobile device is likely a human or an automated program.

Conventional CAPTCHAs are intended to be displayed on computing devices with sufficient display resolution to allow a human user to be able to recognize the distorted words or characters of CAPTCHA. However, when a conventional CAPTCHA is displayed on mobile device such as a cellular phone, the limited display resolution of the mobile device may make it difficult for a human user to recognize the distorted words or characters. Furthermore, conventional CAPTCHA schemes require four or more server calls to be sent from the user's device. Although the number of server calls for implementing conventional CAPTCHA schemes may be acceptable for conventional networks and computing devices with ample communication bandwidth available, applying the same scheme to mobile devices and mobile networks where bandwidth can be limited would drastically degrade the user experience by increasing the amount of time it takes to complete the verification process. Accordingly, embodiments of the present invention provides a human challenge-response test that is suitable for mobile devices and that requires a reduced number of server calls as compared to conventional CAPTCHA schemes.

Prior to discussing various embodiments of the invention, a description of some of the terms used herein are provided below for a better understanding of the invention.

As used herein, an "online account" is an account that can be used via a connection to a network such as the Internet. Examples of online accounts include e-mail, instant message, voice communication, social network accounts, customer accounts associated with one or more merchants, media accounts (associated with applications for managing stored media, receiving streamed media and/or downloading media, etc.), game accounts, and accounts associated with various other services such as money transfer services. In some embodiments, an online account can provide tools and services related to making or receiving payments involving a financial account, such as a bank account, credit card account, debit card account, loan management account, bill payment management account, etc. In some embodiments, different types of online accounts from a service provider may be available. For example, an online account can be a standard account or a test account.

As used herein, a "standard account" is one type of online account that provides a user access to a set of services from a service provider. A standard account is an online account that is intended for a customer of a service provider to enable the customer to access services from a service provider. In some embodiments, a standard account does not provide the capability for a user to test out services from a service provider, for example, for a trial period. In some embodiments, a standard account does not provide the capability for a user to develop services for the service provider or to integrate services from a service provider into a custom application.

As used herein, a "test account" is one type of online account that allows a user to test or sample services from a service provider. The user of a test account may be a user who is considering the service provider's services for purchase. In some embodiments, the user of a test account may be a developer developing services for the service provider or a developer integrating services from the service provider into the user's custom applications. The set of services or features available to a user of a test account may be different from what is available to a standard account. In some embodiments, the set of features and services available to a user of a test account may be a subset of that of a standard account, and/or may include features and services not available to a standard account. In some embodiments, third-party information (e.g., customer or merchant information) generated or submitted through the use of the test account may be fake to ensure that genuine information about customers or merchants are not used during development or testing of services from the service provider.

As used herein, a "request for an online account" or a "request to access an online account," and other variants thereof, can refer to a request to create a new online account (i.e. enrollment or activation of a new online account) or a request to log in to an existing online account. Enrollment or activation of a new online account may involve submission of a username and/or a password that a user intends to use for the new online account, as well as submission of other information about the user. Logging in to an existing online account may involve submission of a username and/or password to enable the user to access services related to the online account. A request for an online account may include submission of other data or information such as a device ID and/or application data provided by a mobile application.

As used herein, a "username" is an identifier that can be used by a service provider to uniquely identify a user. A username can be a character string that may include numbers, letters, alphanumeric characters, symbols, special characters, and/or any combination therefore that can be inputted and understood by computer program. A username can be created by the user or be assigned to the user by a service provider. In some embodiments, a username can be an account number, an email address, a phone number, or any other personal or business information about the user (name or business name, home or business address, social security number, tax identification number, etc.) that may allow a service provider to identify a user As used herein, a "mobile device" is a portable device capable of sending and receiving electronic communications through a mobile network (e.g., 2G/3G/4G/5G networks using any of CDMA/TDMA/FDMA/OFDMA/SDMA channel access). For example, a mobile device may be a cellular phone, smartphone, media player, tablet, personal digital assistant, portable gaming console, other portable device, or any combination thereof. In addition to being capable of communicating through a mobile network, the mobile device may also be capable of communicating with a local area network, the internet or other network via a wired or wireless connection. Wireless connections may occur via GSM, GPRS, EDGE, 3GPP, UMTS (e.g., HSPA, LTE, etc.), WiMax, or other mobile communication technologies or short range communication technologies such as WiFi, Bluetooth, or other wireless protocols.

As used herein, a "device ID" is an identifier that can be used to uniquely identify a mobile device. For example, a device ID may be a Mobile Subscriber Integrated Services Digital Network (MSISDN) number or other telephone number associated with the device, International Mobile Subscriber Identity (IMSI) number, International Mobile Station Equipment Identity (IMEI) number, media access control (MAC) address, internet protocol (IP) address, a manufacturer's serial number, or other device identification.

As used herein, a "mobile application" is a software program designed to run on a mobile device. A mobile application may interact with a user through a mobile device and may cause a mobile device to perform certain functions such as communicating with a server or displaying information on the mobile device. A mobile application can be a custom application provided by a service provider, and may be available for download through an online application repository such as iTunes or Google Play store. A mobile application may have different versions that are customized for different platforms, operating systems, and/or mobile devices.

As used herein, "application data" refers to data or information that is provided to a server by a mobile application running on a mobile device. Application data can be provided to a server in a request for an online account. Application data can include data or information inputted by a user using the mobile application on a mobile device. For example, a mobile application may display a computer generated form (e.g., a HTML form) to request information from a user. The form may include any number or combination of text input fields, radio buttons, checkboxes, drop-down lists, or other formats to request information from a user. A user may enter textual input, or select radio buttons, checkboxes, or elements from a drop-down list on the form. Application data may include any such information provided by the user in the form. In some embodiments, application data may include data or information that a mobile application retrieves from a mobile device without requiring any user input. For example, a mobile application may retrieve a phone number or an email address stored on a mobile device. A mobile application may also retrieve an operating system type/version, a display resolution of the mobile device, or a location of the mobile device without requiring any user input. Application data may include any such information retrieved from the mobile device by the mobile application. Application data may also include data or information about the mobile application. For example, application data may include a version number of the mobile application that the mobile application provides to a server. Any of the application data can be associated with an online account.

As used herein, a "request ID" is an identifier that is generated by a server in response to receiving a request for an online account. A request ID is used by the server to identify the request. In some embodiments, a request ID can be used by the server to lookup information about the request. A request ID can be an application ID, a one-time key, or both.

As used herein, an "application ID" is an identifier that can be used to identify a mobile application, application data, a mobile device, or any combination thereof that is associated with a particular request for an online account. An application ID can be generated by a server in response to receiving a request for an online account. In some embodiments, an application ID can be generated based on information included in the request for an online account such as any of the application data included in the request for an online account and/or a device ID. In some embodiments, if two separate requests for an online account include the same information or data being submitted with the respective request (i.e. same application data and device ID), the two separate requests may result in the generation of the same application ID.

As used herein, a "one-time key" is an identifier that is used to uniquely identify each time a request for an online account is received by a server. A one-time key can be character string that can include numbers, letters, alphanumeric characters, symbols, special characters, and/or any combination thereof. In some embodiments, a one-time key can be a random number or a portion of a random number. In some embodiments, the one-time key can be a counter value or a timer value, or can be generated based on a counter value or timer value maintained by a server. In some embodiments, in contrast to an application ID, if two separate requests for an online account include the same information or data being submitted with the respective request, each request may have a different one-time key that is used to identify or track the respective request.

As used herein, a "message" can be information or data transmitted between a mobile device and a server. For example, a message may be a short message service (SMS) communication, an e-mail, an instant message, an image, a voicemail, a sound file, or a message originated by or intended for a mobile application of the mobile device, such as a mobile application that is used to access an online account.

As used herein, a "hash value" is a value computed over a number of data elements using a hash function. In some embodiments, a hash function can be a message digest or a checksum calculation. In some embodiments, a hash function can include cryptographic operations using an encryption key. Examples of hash function can include Message Authentication Code algorithms (e.g., MAC, HMAC, etc.), Message-Digest algorithms (e.g., MD4, MD5, etc.), Secure Hash Algorithms (e.g., SHA-0, SHA-1, SHA-2, SHA-3, etc.), RACE Integrity Primitives Evaluation Message Digest algorithms (e.g., RIPEMD-128/256, RIPEMD-160, RIPEMD-320, etc.), or any variants thereof.

As used herein, a "human challenge-response test" may include any information used in testing whether a user is a human or an automated program. For example, a human challenge-response test may comprise one or more of the plurality of challenge items from a challenge repository. Further, a human challenge-response test may include an image that is rendered to display the selected challenge item in an image format. Examples of a human challenge-response test can include an image of a character string or an image of a numeric PIN number.

As used herein, a "server" is a computer or a cluster of computers having one or more processors. For example, the server computer can be a large mainframe, a minicomputer cluster, or a group of servers functioning as a single unit. A server can be a web server, a database server, a verification server, or other servers for performing one or more particular functions.

Exemplary Embodiments of Online Account Systems

FIG. 1 illustrates a system 100 for accessing online accounts according to various embodiments of the present invention. System 100 includes an account request server 120 associated with a service provider who provides services to users through the use of online accounts, an online account database 130 that stores online account information (e.g., account credentials such as usernames and/or passwords) coupled to or integrated with account request server 120, and user devices such as mobile device 110 communicatively coupled to account request server 120 through a communication network 150.

A service provider can be a financial institution, government organization, membership organization, or any website operator that provides information or services on or through the use of the internet. Examples of services that a service provider can provide can include e-mail, instant message, voice communication, and social networking, etc. In some embodiments, the service provide may provide a payment processing service for merchants to process payments from the merchant's customers. For example, a service provider may provide services to assist merchants to obtain payment authorization from issuers of customer payment accounts such as credit card accounts through a payment processing network (not shown).

A payment processing network may include any entity that processes transactions. The payment processing network may include data processing subsystems, networks, and operations used to support and deliver authorization services, exception file services, and clearing and settlement services. For example, the payment processing network may comprise a server computer, coupled to a communications network interface (e.g., by an external communication interface), and a database(s) of information. An exemplary payment processing network may include for example, VisaNet™. CYBERSOURCE, AUTHORIZE.NET, PLAYSAPN, etc. as well as equivalents thereof). Payment processing networks such as VisaNet™ are able to process credit card transactions, debit card transactions, and other types of commercial transactions. VisaNet™, in particular, includes a VIP system (Visa Integrated Payments system) which processes authorization requests and a Base II system which performs clearing and settlement services. The payment processing network may use any suitable wired or wireless network, including the Internet. Although many of the data processing functions and features of some embodiments may be present in the payment processing network (and a server computer therein), it should be understood that such functions and features could be present in other components such as the service provider web server computer, and need not be present in the payment processing network, or a server computer therein.

A service provider may incorporate a human challenge-response test when processing requests for online accounts to limit access to only those of the requests that likely originate from a human operating a user device such that the servers of the service provider are not bombarded by requests from automatic scripting attacks or other automated computer programs. Requests from automated programs can slow down the server for other users or cause a threat to the security of the system. Thus, it may be desirable to limit automated programs from accessing the servers of a service provider.

In accordance with some embodiments, account request server 120 processes requests for online accounts of a service provider from user devices (e.g., mobile device 110 and/or other user computing devices) using human challenge-response tests. A request for online account can be for the creation of a new online account (e.g., enrollment or activation of a new online account), and/or can be for logging in to an existing online account. In some embodiments, an online account can be a standard account or a test account. A standard online account is an account that is used by customers of the service provider (e.g., a merchant) to access services from a service provider (e.g., payment processing services); whereas a test account can be an account that is used by a developer who is developing services for the service provider or a developer integrating services from the service provider into the user's custom applications, and may have access to a different set of features than a standard account.

Account request server 120 may be a server operated by a service provider that provides online accounts and related services to users. Alternatively, account request server 120 may be operated by a partner or an affiliate of the service provider. Account request server 120 can be a dedicated server whose sole purpose is to process requests for online accounts, and does not provide any of the core services that a service provider provides. For example, for a service provider that provides payment processing services, account request server 120 can be a dedicated server that does not provide payment processing services, but is instead used to verify whether a user requesting an online account from a user device is a human or an automated program. Separation of account request server 120 from other servers that perform payment processing services creates a firewall to prevent user devices from communicating directly with the other servers of the service provider during the online account request process. Such a separation can reduce the possibility of hacking attempts from reaching critical severs that are used to provide the core services of the service provider. In other embodiments, account request server 120 can be integrated with one or more other servers associated with the service provider. For example, account request server 120 can be part of a web server or a database server that is used to provide payment processing services from the service provider.

Account request server 120 includes at least one processor 122 coupled to at least one memory 124 storing computer readable code for implementing a challenge generation module 127 and a verification module 128. It should be understood that while challenge generation module 127 and verification module 128 are described as performing specific functions of account request server 120, the specific functions of each module can be integrated into one or more modules and/or be separated into any number of separate modules. Online account server 104 may also comprise other software elements and/or modules, including an operating system and/or other code, such as application programs. It should be appreciated that alternate embodiments of account request server 120 may be used in system 100. For example, elements shown as software (e.g., challenge generation module 127, verification module 128) may alternatively be implemented in hardware and/or combination of hardware and software.

Challenge generation module 127 is configured to generate human challenge-response tests that can be adapted for display on mobile devices (i.e. mobile CAPTCHAs). The human challenge-response test can include an image of a character string that is generated randomly on the fly by using a random number generator or can be generated by selecting a character string from a set of stored character strings. The human challenge-response test can include an image of a string of characters such as numbers, letters, alphanumeric characters, symbols, special characters, and/or any combination thereof. In some embodiments, the solution to the human challenge-response test can be the character string itself. For example, a human challenge-response test can be an image of a PIN number with the string of numbers "9377," and the solution to this test can be "9377." In other embodiments, the human challenge-response test can be an image of a string of characters representing a mathematical equation such as "1+2," and the solution to this test can be "3," which is the solution to the mathematical question. In some embodiments, the number of characters in the character string and/or the image size (e.g., the number of pixels) can be generated based on the device capabilities of a mobile device such as a display resolution of the mobile device.

Verification module 128 receives incoming requests for online accounts from user devices (e.g., mobile device 110 and/or other user devices), and verifies whether the user sending the request for online account is likely a human or not. When a request for an online account is received, verification module 128 may start a verification session for the request, obtain a human challenge-response test from challenge generation module 127, and send the human challenge-response test to the user device in a challenge message. A challenge response message is expected to be received from the user device in response to the challenge message. In some embodiments, verification module 128 may store information and data associated with the request for online account in memory 124, and may set an expiration time period for the verification session. If the verification process is not completed before the verification session expires (e.g., a challenge response message is not received), the verification session ends and some or all of the information or data associated with the request for online account may be removed or deleted from memory 124. In some embodiments, the expiration time period can be the same for all requests for online accounts. In other embodiments, the expiration time period can be set differently based on the type of online account being requested (e.g., a standard account or a test account) and/or be based on any of the information received from the user device. In other embodiments, a verification session may not have an expiration time period associated with the verification session.

If verification module 128 receives a challenge response message from the user device within the expiration time period while the verification session is still valid, verification module 128 determines whether the user sending the request for online account is likely a human based on the challenge response message. If verification module 128 determines that the user is likely a human, verification module 128 completes and fulfills the request for online account and ends the verification session. For example, if the request is to enroll or activate a new online account, verification module 128 may create a new online account and store information relating to the new online account (e.g., account credentials such as username and/or password) in online account database 130. If the request is to log into an existing online account, verification module 128 may compare the user's account credentials against online account database 130 and redirect the user device to other servers of the service provider to enable the user to access services from the service provider if the user's account credentials match what is stored in online account database 130.

Memory 124 of account request server 120 may also include a temporary storage element 126. Temporary storage element 126 can be implemented as random access memory or as cache memory. In some embodiments, temporary storage element 126 can be implemented in a storage element that is external to memory 124 or external to account request server 120. Temporary storage element 126 is configured to store information or data on a temporary basis for a predetermined amount of time, and can be configured to automatically remove some or all of the stored information or data that have been stored therein longer that the predetermined amount of time (e.g., after an expiration time period). For example, temporary storage element 126 can be used to store information or data associated with a verification session, and can automatically remove some or all of the information or data relating to the particular verification session after the expiration time period for the particular verification session has expired.

Mobile device 110 is a portable device capable of sending and receiving electronic communications through a mobile network. For example, a mobile device may be a cellular phone, smartphone, media player, tablet, personal digital assistant, portable gaming console, other portable devices, or any combination thereof. Mobile device 110 include a user interface 118, at least one processor 112, and at least one memory 144 coupled to the at least one processor 112 storing computer readable code for implementing a mobile application 116.

User interface 118 can be any interface of the mobile device 110 that can receive input from a user for responding to a human challenge-response test. For example, user interface 118 can be a keypad (e.g., with numeric buttons or keys), a keyboard (e.g., with alphanumeric buttons or keys such as a QWERTY keyboard or variant), a touch-sensitive panel that can display a virtual keypad or virtual keyboard and/or can received other user touch inputs, a camera or motion sensor that can receive user gesture or motion input, or a microphone that can receive sound or voice input from a user.

Mobile application 116 is a software application designed to run on a mobile device (e.g., mobile device 110). In some embodiments, mobile application 116 can be a custom application provided by a service provider, and can be downloaded from a service provider's website or from an online repository such as iTunes or Google Play store. Mobile application 116 may cause mobile device 110 to perform certain functions such as displaying information on a display of mobile device 110, and/or communicating with a server of a service provider such as account request server 120 to enable the user to obtain access to services provided by the service provider on mobile device 110. Mobile application 116 may have different versions that are customized for different platforms, operating systems, and/or mobile devices. In some embodiments, mobile application 116 may retrieve personal information or device information stored on mobile device 110 without requiring any user input.

Communications network 150 includes a mobile network that can be used to send and receive communications between mobile devices (e.g., mobile device 110) and servers (e.g., account request server 120). Communication network 150 may also include other wired or wireless networks capable of sending and receiving communications messages between entities. For example, the communication network 150 may also include the internet, other wireless or mobile communication network, a telephone network, or any other suitable network of computers or physical medium capable of transporting electronic messages between entities. As would be understood by one of ordinary skill in the art, any suitable communications protocol for storing, representing, and transmitting data between components in the system may be used. Some examples of such methods may include utilizing predefined and static fields (such as in core TCP/IP protocols); "Field: Value" pairs (e.g. HTTP, FTP, SMTP, POP3, and SIP); an XML based format; and/or Tag-Length-Value format.

Exemplary Embodiments of a Verification Process

A more detailed description of verification processes used for verify that a user requesting an online account is likely a human according to embodiments of the invention will now be described. The verification processes can be performed with an online account system such as system 100 of FIG. 1. While the processes and techniques herein are described with reference to a user using a mobile device to request an online account, it should be understood that the processes and techniques can be applied to a user using other types of computing devices such as a personal computer or a laptop computer, or any variants thereof.

Figure 2:
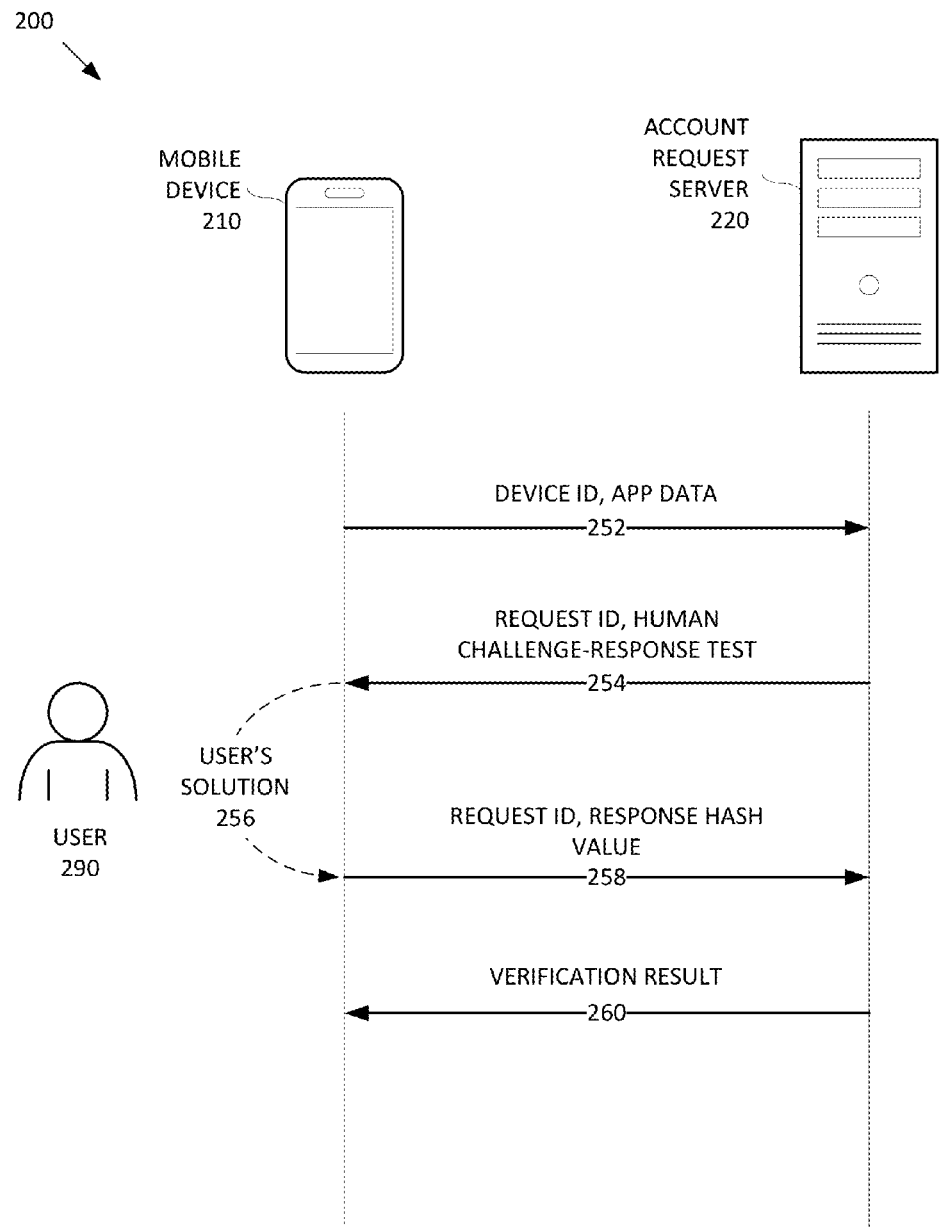
FIG. 2 illustrates an exemplary flow of information between a mobile device and a server, according to various embodiments.

FIG. 2 shows a diagram 200 illustrating the flow of information between a mobile device 210 (e.g., a mobile phone, a tablet, etc.) and an account request server 220 in a verification process that is used to verify whether a user requesting an online account from mobile device 210 is likely a human or an automated program. To request for an online account (e.g., a standard account, or a test account) from a service provider, a user 290 of mobile device 210 launches a mobile application (e.g., mobile application 116) on mobile device 210. In some embodiments, the mobile application may be a custom mobile application provided by the online account's service provider. In other embodiments, the mobile application may be a mobile web browser, and the web browser is directed to a web page associated with the service provider.

The mobile application may display a form for user 290 to input information such as a username, a password, type of account being requested, etc. The form may also include other fields for user 290 to enter other information relating to the user or to the online account. Some or all of the information requested on the form may be entered manually on mobile device 210 by user 290. In some embodiments, one or more fields on the form can be automatically populated by the mobile application based on information previously stored on mobile device 210. For example, if the request for an online account is to log in to an existing online account, the mobile application may retrieve a username and/or a password from one or more cookies associated with the online account stored on mobile device 210. As another example, if the request for an online account is to create a new online account, the mobile application may retrieve an email address of an email account stored on mobile device 210 or retrieve a phone number of mobile device 210, or other personal information stored on mobile device 210, and automatically populate the corresponding fields on the form. In some embodiments, the email address or the phone number can be used as the username of the new online account, and the mobile application populates the username field of the form with the email address or phone number. In other embodiments, the mobile application may assign an automatically generated username and/or password for the new online account, and automatically populate the username and/or password of the form with the automatically generated information.

In some embodiments, the mobile application may also retrieve information about mobile device 210. For example, mobile application may retrieve the device ID of the mobile device and/or device capabilities of mobile device 210 such as type, model, operating system, display resolution, data connectivity bandwidth, and/or other properties of mobile device 210. In some embodiments, a particular version of mobile application may be configured to run with a particular set of device capabilities of a mobile device (e.g., operating system, display resolution, etc.). In such embodiments, a particular version of the mobile application that was designed specifically for mobile device 210 may have been downloaded to mobile device 210. As such, it may not be necessary for the mobile application to retrieve some of the information about mobile device 210, because the version of the mobile application itself is indicative of one or more of the device capabilities of mobile device 210 (e.g., type, model, operating system, display resolution, data connectivity bandwidth, etc.).

In some embodiments, once the requested information on the form displayed by the mobile application are provided, the mobile application may send a request message 252 to account request server 220 to request for an online account from the service provider. The request message 252 may include application data (i.e. data or information provided by the mobile application) and a device ID identifying the mobile device 210. The application data may include some or all of the information provided on the form (e.g., username, password, type of account being requested, etc.), information about the particular mobile application (e.g., version of the mobile application, type of account the mobile application is used for, etc.), information about mobile device retrieved by the mobile application (e.g., type, model, operating system, display resolution, data connectivity bandwidth, and/or other device capabilities, etc.), and/or other personal information retrieved from mobile device 210.

Upon receiving the request message 252 including the application data and the device ID, account request server 220 registers the request for an online account and initiates a verification session. Account request server 220 (e.g., a verification module of account request sever 220) may generate a request ID that is used to identify the request for the online account. In some embodiments, the request ID can be an application ID, a one-time key (OTK), or both. An application ID can be generated based on the device ID and some or all of the application data (e.g., username, password, etc.) provided in the request. Thus, according to some embodiments, requests for online account coming from the same device (i.e. same device ID) and having the same application data may result in the generation of the same application ID.

In some embodiments, account request server 220 (e.g., a verification module of account request sever 220) can generate a one-time key (OTK) for the verification session. The OTK is used to uniquely identify each attempt that is made to request an online account. In other words, each request for an online account received by account request server 220 has a unique OTK. The OTK can be a character string that can include numbers, letters, alphanumeric characters, symbols, special characters, and/or any combination thereof. In some embodiments, a one-time key can be a random number or a portion of a random number. In some embodiments, the one-time key can be a counter or timer value, or can be generated based on a counter or timer value maintained at account request server 220. In some embodiments, the OTK can be used in any of the processes described herein in place of the application ID.

In accordance with some embodiments, account request server 220 (e.g., a verification module of account request sever 220) may also set an expiration time period for the verification session such that if the verification process is not completed (e.g., a correct solution to human challenge-response test is not received) within the expiration time period, the verification session would end, and user 290 of mobile device 210 would have to submit a new request for an online account to start a new verification session. The expiration time period is used to limit the user 290 to a predefined amount of time to complete the verification process. The expiration time period also helps to reduce the amount of data that is stored and maintained at account request sever 220 because some or all of the information associated with a particular request for online account may be removed and deleted once the verification session expires. In other embodiments, a verification session may not have an expiration time period associated with the verification session.

In some embodiments, the expiration time period can be the same for all requests for online accounts. In other embodiments, the expiration time period can be set differently based on the type of online account being requested (e.g., a standard account or a test account). For example, a request for a standard account can have a shorter expiration time period than a request for a test account, or vice versa. The expiration time period may also be set based on any of the information received in the request. For example, the expiration time period may be set based on the device ID and how many times requests with the same device ID are received within a monitoring time period. In some embodiments, the expiration time period may be reduced each time a request for an online account is received that has the same device ID within the hour. In some embodiments, if the number of requests received with the same device ID within the monitoring time period exceeds a threshold, the expiration time period may be set to zero such that requests for online accounts having the same device ID will no longer be processed during the monitoring time period.

In response to receiving request message 252, account request server 220 (e.g., challenge generation module of account request server 220) also generates a human challenge-response test. The human challenge-response test can include an image of a character string that is generated randomly on the fly by using a random number generator, or can be generated by selecting a character string from a set of stored character strings. The human challenge-response test can include an image of a string of characters such as numbers, letters, alphanumeric characters, symbols, special characters, and/or any combination thereof. In some embodiments, the character string can be a numeric PIN (personal identification number). The number of characters in the image and the image size (e.g., the number of pixels) can be generated based on the device capabilities of mobile device 210 (e.g., type, model, operating system, display resolution, data connectivity bandwidth, etc.). In other embodiments, a standard number of characters and a standard image size may be used, and it may be up to the mobile application running on mobile device 210 to adjust the human challenge-response test such that the human challenge-response test may be optimally displayed on mobile device 210.

In some embodiments, the character string of the human challenge-response test can be based on the OTK. For example, the OTK can be based on a random number with sixteen digits or characters. Account request server 220 may determine that an optimal length for the character string of the human challenge-response test based on the capabilities of mobile device 210 is four characters. According to some embodiments, the four characters of the human challenge-response test can be selected from the sixteen digit random number that is used to generate the OTK, and the four characters selected from the sixteen digit random number may be removed to generate the OTK. The characters can be selected at random positions (i.e. random digits of the random number) or can be selected at predetermined positions. As an example, suppose a sixteen digit random number is "4565664813209377." Account request server 220 may select the last four digits "9377" to be used as the characters in the human challenge-response test. In this example, the OTK may be "456566481320" and the human challenge-response test may be an image of the character string "9377." Thus, according to some embodiments, the length of the character string of the OTK can be based on the length of the character string of the human challenge-response test. For example, the total length of the character string of the OTK and the length of the character string of the human challenge-response test can be a fixed length (e.g., sixteen characters), and the length of the character string of the OTK can be variable depending on the length of the character string of the human challenge-response test that would be optimal for mobile device 210.

Once a human challenge-response test is generated, account request server 220 may compute a verification hash value. According to some embodiments, the verification hash value can be computed by account request server 220 before a challenge response message 258 (described below) is received from mobile device 210. In other embodiments, the verification hash value can be computed by account request server 220 after a challenge response message 258 is received from mobile device 210. The verification hash value can be computed over the correct solution to the human challenge-response test and one or more of the application ID, the device ID, and/or the OTK. Thus, in various embodiments, the verification hash value can be a hash of any one of the following sets of data elements: (1) solution to the human challenge-response test and application ID; (2) solution to the human challenge-response test and device ID; (3) solution to the human challenge-response test and OTK; (4) solution to the human challenge-response test, application ID, and device ID; (5) solution to the human challenge-response test, application ID; and OTK; (6) solution to the human challenge-response test, device ID, and OTK; or (7) solution to the human challenge-response test, application ID, device ID, and OTK. The verification hash value can be computed using any hash function, and in some embodiments, may include the use of one or more of Message Authentication Code algorithms (e.g., MAC, HMAC, etc.), Message-Digest algorithms (e.g., MD4, MD5, etc.), Secure Hash Algorithms (e.g., SHA-0, SHA-1, SHA-2, SHA-3, etc.), RACE Integrity Primitives Evaluation Message Digest algorithms (e.g., RIPEMD-128/256, RIPEMD-160, RIPEMD-320, etc.), or any variants thereof.

According to some embodiments, the set of data elements and the hash function used in the verification hash value computation can be selected based on the version of the mobile application running on mobile device 210 and/or the device capabilities of mobile device 210 discerned from the application data submitted with the request message 252. Selecting the set of data elements and the hash function based on the version of the mobile application running on mobile device 210 can help ensure that the same calculation can be carried by the mobile application running on mobile device 210.

In some embodiments, account request server 220 may store one or more of the application ID, the device ID, the application data, the OTK, and the solution to the human challenge-response test as an entry in a table, a database, or other data structure. The application ID and/or the OTK may be a request ID that is used as a lookup key to look up the entry corresponding to a particular request or verification session in the data structure. In some embodiments, if the verification hash value is computed before receiving challenge response message 258, the verification hash value can be stored in place of one or more of the above data elements (e.g., in place of any combination of application ID, the device ID, the application data, the OTK, and the solution to the human challenge-response test). This may help reduce the amount of storage memory used for each verification session. In some embodiments, some or all of the information may be stored only temporarily (e.g., in temporary storage element 126) and is discarded after the verification process completes or when the verification session expires. Some or all of the store information associated with the verification session (e.g., application ID, the device ID, the application data, the OTK, and the solution to the human challenge-response test) may automatically be removed or deleted when the expiration time period for the verification session lapses. According to some embodiments, one or more data elements may remained to be stored even after the verification expires. For example, instead of removing or deleting the device ID from storage, the device ID may be kept such that the number of requests having the same device ID can be tracked and monitored. In other embodiments, application data such as a version of the mobile application and/or type of account being requested, etc. may be kept to collect usage and statistical data.

Account request server may then send a challenge message 254 to mobile device 210. Challenge message 254 may include the request ID (e.g., application ID, OTK, or both) and the human challenge-response test (e.g., image of a character string). Upon receiving challenge message 254, the mobile application running on mobile device 210 may adjust the human challenge-response test (e.g., resize the image) such that the human challenge-response test can be optimally displayed on mobile device 210.

Upon viewing the human challenge-response test, user 290 is expected to enter a user's response 256 (i.e. user's solution) to the human challenge-response test on the mobile device 210. For example, in some embodiments, the human challenge-response test can be an image of a numeric PIN. The user 130 is expected to enter the digits of the numeric PIN on mobile device 210. The user's response 256 to the human challenge-response test can be entered on mobile device 210 using any one of the user interfaces available on mobile device 210. For example, user 290 may enter the user's response 256 using a keypad (e.g., with numeric buttons or keys), a keyboard (e.g., with alphanumeric buttons or keys such as a QWERTY keyboard or variant), or a touch-sensitive panel that can display a virtual keypad or virtual keyboard. User 290 may use a stylus or fingertip to write out user's response 256 on a touch-sensitive panel, and a writing recognition program available on mobile device 210 or on the mobile application may translate the writing into characters. In some embodiments, user 290 may speak or voice user's response 256 into a microphone of mobile device 210, and a voice or speech recognition program available on mobile device 210 or on the mobile application may translate the speech into characters. In some embodiments, user 290 may be able to gesture or motion user's response 256 (e.g., hold out the number of fingers corresponding to each digit of a numeric PIN) in front of a camera or motion sensor of mobile device 210, and a motion recognition program available on mobile device 210 or on the mobile application may translate the gesture or motion into characters.

Once user 290 has entered user's response 256 to the human challenge-response test on mobile device 210, the mobile application can compute a response hash value based on user's response 256 (i.e. the user's solution) to the human challenge-response test and one or more of the application ID received from account request server 220, the device ID of the mobile device 210, and/or the OTK received from account request server 220. The hash function used for computing the response hash value and the set of data elements included in the computation should match the hash function and the set of data elements that account request server 220 used for computing its verification hash value.

The request ID (e.g., application ID, OTK, or both) and the response hash value are then transmitted from mobile device 210 to account request server 220 in a challenge response message 258. The use of hash values can provide the benefit that less data may need to be transmitted from the mobile device when responding to challenge message 252. For example, instead of transmitting all of the application ID, the OTK, the device ID, and the user's solution to the human challenge-response test, a single hash value having less characters than these data elements combined can be transmitted.

Upon receiving challenge response message 258, account request server 220 may use the request ID (e.g., application ID, OTK, or both) to determine the expiration time period for this particular verification session and to determine if the verification session has expired. If it is determined that the verification session has expired, the request for an online account is denied, and a verification failure indication is sent to mobile device 210 in a verification result message 260. User 290 may restart a new verification session by repeating the process described above.

If it is determined that the verification session has not expired yet and is still valid (i.e. the expiration time period has yet to lapse), account request server 220 may look up the verification session entry by using the request ID (e.g., application ID, OTK, or both) transmitted in challenge response message 258 to retrieve a previously computed verification hash value for the verification session to determine if the response hash value matches the verification hash value. In some embodiments in which the verification hash value is not computed prior to receiving challenge response message 258, account request server 220 may retrieving the data elements corresponding to the verification session needed to compute the verification hash value, and compute the verification hash value at this point in time after challenge response message 258 has been received. Computing the verification hash value after receiving challenge response message 258 has the benefit that unnecessary hash value computations, for example, for expired verification sessions, can be avoided to reduce loading on account request server 220.

If the response hash value does not match the verification hash value, then it is assumed that user 290 who is requesting for an online account from mobile device 210 is an automated program and the verification session is terminated. The request for an online account is denied, and a verification failure indication is sent to the mobile device 210 in a verification result message 260. In some embodiments, the verification result message 260 may include additional information such as the reason for denying the request (e.g., expiration period of time has lapsed, user's solution to human challenge-response test is incorrect) or other information such as the number of attempts remaining for the particular mobile device.

If the response hash value matches the verification hash value, user 290 is assumed to be a human and the request for online account is fulfilled. For example, if the request is to enroll or activate a new online account, a new online account is created and information relating to the new online account (e.g., account credentials such as username and/or password) is stored in an online account database. A verification success indication in verification result message 260 is transmitted to mobile device 210 to notify user 290 that a new online account has been created. If the request is to log into an existing online account, the user's account credentials may be compared against an online account database, and if the credentials are valid, a verification success indication in verification result message 260 is transmitted to mobile device 210 to notify user 290 that user 290 has successfully logged into the user's online account. The mobile application may be redirected to other servers of the service provider to enable user 290 to access services from the service provider using the mobile application.

As illustrated in FIG. 2, according to embodiments of the invention, the process of verifying that a user requesting an online account (e.g., to create a new online account, or to log into an existing account) is likely a human requires no more than two server calls to be sent from mobile device 290. This is at least half the number of server calls required as compared to conventional CAPTCHA processes. By reducing the number of server calls required, the load on mobile networks which often have limited available data bandwidth can be reduced. Furthermore, the user experience can also be enhanced because the online account request process can be completed faster with less data being transmitted to and from mobile devices.

It should be appreciated that any of the messages described above (e.g., request message 252, challenge message 254, challenge response message 258, and/or verification result message) can be encrypted by the mobile application and/or account request server 220 prior to transmitting the message. The encryption can be performed using symmetric or asymmetric key pairs, and either the mobile application or the account request server 220 may be provided with the public key or the private key of a key pair.

Alternative Embodiments of Verification Process of Online Account Requests

According to the embodiments describe above, application data for completing the online account request process is transmitted in request message 252. The application data may include some or all of the information provided on the form of the mobile application (e.g., username, password, type of account being requested, etc.), information about the particular mobile application (e.g., version of the mobile application, type of account the mobile application is used for, etc.), information about mobile device retrieved by the mobile application (e.g., type, model, operating system, display resolution, data connectivity bandwidth, etc.), and/or other personal information retrieved from mobile device 210.

In alternative embodiments, instead of transmitting all of the application data for completing the online account request process in request message 252, the application data can be split up and transmitted separately in request message 252 and in challenge response message 258. For example, upon launching the mobile application and before any information is entered into a form of the mobile application, application data pertaining to information about the particular mobile application and/or information about mobile device retrieved by the mobile application can be sent in request message 252. In the embodiments, the human challenge-response test can be received by mobile device 210 in challenge message 254 before the mobile application displays a blank form. The human-challenge response test can be displayed with a blank form before information requested on the form is entered manually by user 290 or automatically populated by the mobile application. Hence, as an example, no username and/or password information are sent in request message 252. Instead, a username and/or password and/or other application data can subsequently be sent in challenge response message 258 together with the response hash value. In such alternative embodiments, the amount of data transmitted up front in request message 252 can be reduced. In some cases, this may reduce the amount of loading on account request server 220 because the application data that is supposed to be sent in challenge response message 258 with the response hash value may never be sent if a user does not respond to challenge message 254.

Exemplary Methods of Mobile Device

Figure 3:
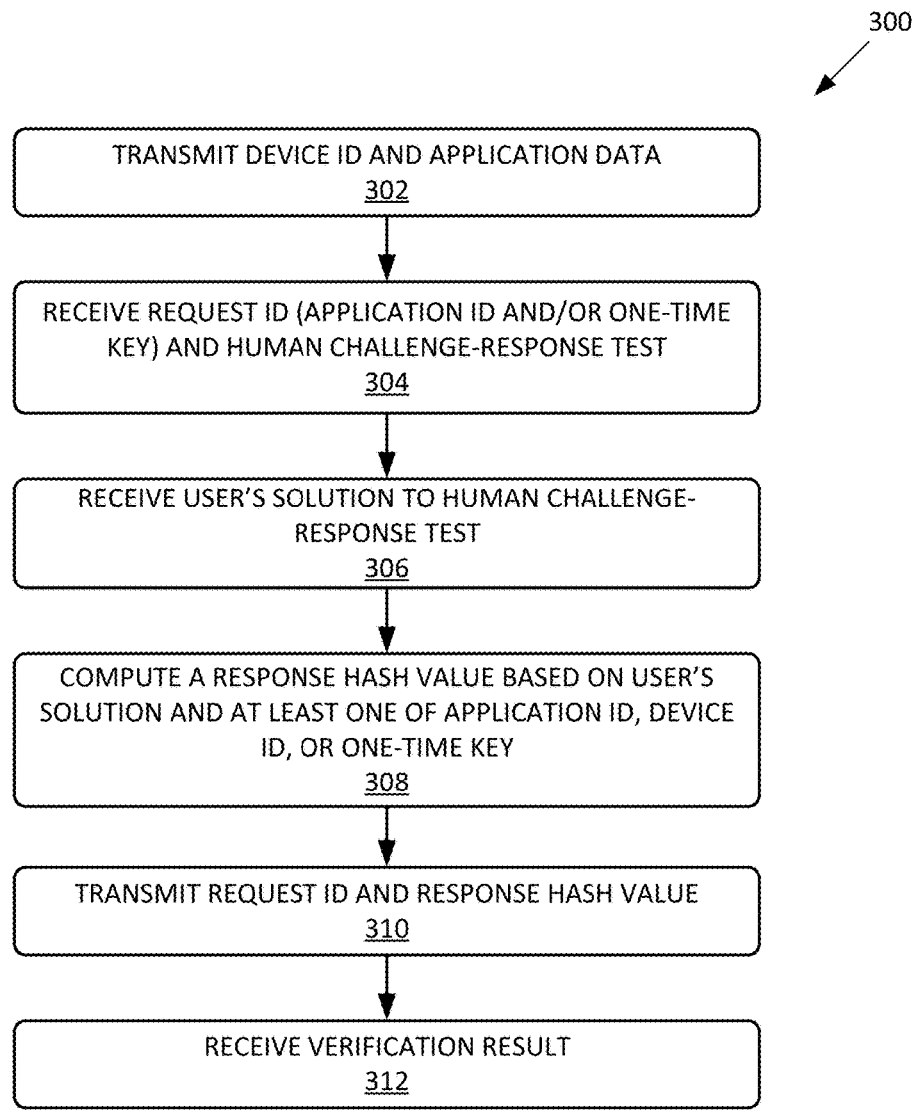
FIG. 3 illustrates a flow diagram of an exemplary verification process performed in a mobile device, according to various embodiments.

FIG. 3 illustrates a flow diagram 300 of a verification process performed by a mobile device according to some embodiments. At block 302, a mobile application running on a mobile device transmits a device ID and application data in a request message to an account request server to request for an online account. The mobile application can be a custom mobile application provided by the online account's service provider or a mobile web browser. The device ID and application data can be in accordance with any of the embodiments described herein.

At block 304, a request ID (e.g., an application ID, OTK, or both) and a human challenge-response test generated by the account request server is received in a challenge message. The human challenge-response test can be in accordance with any of the embodiments described herein. The mobile application then displays the human challenge-response test on the mobile device. At block 306, the user's response (i.e. user's solution) to the human challenge-response test is received from the user through an input interface of the mobile device such as any input interface described herein.

At block 308, the mobile application computes a response hash value based on the user's solution to the human challenge-response test and one or more of the device ID of the mobile device, the application ID received from the account request server, and/or the OTK received from the account request server. The response hash value can be computed in accordance with any of the embodiments described herein. At block 310, the request ID and the response hash value are transmitted in a challenge response message to the account request server.

At block 312, a verification result is received from the account request server. The verification result may indicate a verification success and that the request for an online account is fulfilled (e.g., a new online account is created or the user successfully logged into an existing online account) if the response hash value sent to the account request server matches a verification hash value calculated by the account request server using the correct solution to the human challenge-response test. The verification result may indicate a verification failure if the verification session for the request has expired, or if the user's solution to the human challenge-response test is incorrect, resulting in a discrepancy between the response hash value and the verification hash value.

Exemplary Methods of Account Request Server

Figure 4:
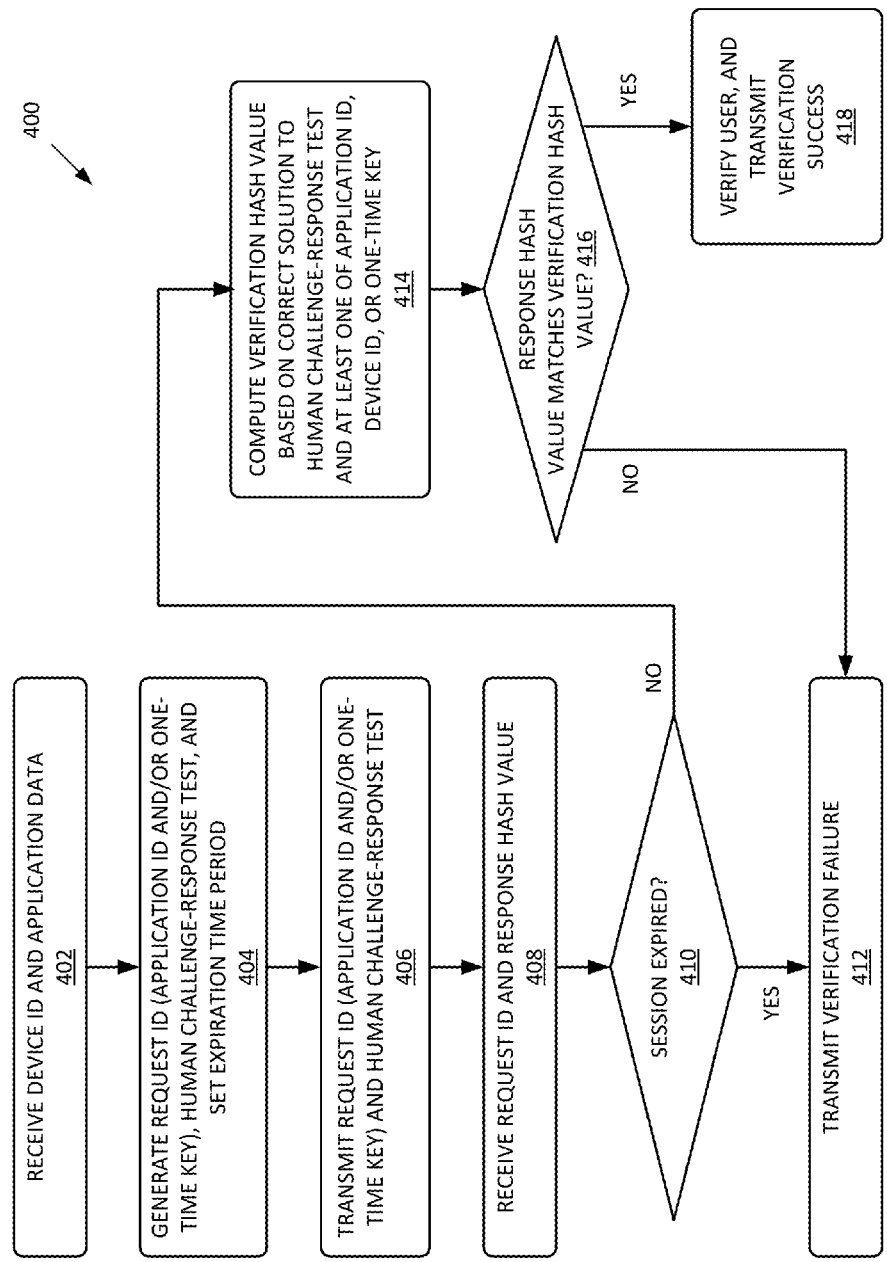
FIG. 4 illustrates a flow diagram of an exemplary verification process performed in a server, according to various embodiments.

FIG. 4 illustrates a flow diagram 400 of a verification process performed by an account request server according to some embodiments. At block 402, the account request server receives a device ID associated with a mobile device and application data from a mobile application running on the mobile device in a request message to request an online account. In response to receiving the request message, the account request server starts a verification session and stores one or more of the device ID and application data. At block 404, the account request server generates a request ID (e.g., an application ID, OTK, or both) to identify the request for the online account. An application ID can be generated based on at least some of the information received in the request message (e.g., device ID, and/or any of the application data according to any embodiments described herein). A one-time key (OTK) can be generated to uniquely identify each request for an online account that is received by the account request server. The account request server also generates a human challenge-response test used for verifying whether the request for online account originated from a human or an automated program. In some embodiments, the account request server may also set an expiration time period after which the verification session would expire. The request ID (e.g., application ID, OTK, or both), the correct solution to the human challenge-response test, the device ID, and/or the application data can be stored together as an entry in a data structure. In some embodiments, a verification hash value can also be computed and be stored in addition to or in place of any of the application ID, the correct solution to the human challenge-response test, the OTK, the device ID, the application data, and/or any combination thereof. The verification hash value can be computed according to any of the embodiments described herein. In some embodiments, some or all of the information stored is only stored temporarily, and some or all of the information are discarded when the verification process is either completed with a verification success or a verification failure, and/or when the expiration time period has lapsed.

At block 406, the request ID (e.g., application ID, OTK, or both) and human challenge-response test are transmitted to the mobile device in a challenge message. At block 408, the account request server receives a response hash value and the request ID (e.g., application ID, OTK, or both) from the mobile device in a challenge response message. At block 410, the account request server determines if the verification session has expired. In some embodiments, the expiration time period associated with the request ID (e.g., application ID, OTK, or both) is compared with a timestamp of the challenge response message to determine if the verification session has expired. In some embodiments, the verification session is determined to have expired if the request ID (e.g., application ID, OTK, or both) is not found by the account request server (e.g., the application ID and/or OTK has been discarded). If the verification session has expired, the account request sever transmits a verification failure indication to the mobile device. If the verification session has not yet expired, the verification process continues at block 414.

At block 414, the account request server computes a verification hash value if the verification hash value was not previously computed. The verification hash value is computed based on the correct solution to the human challenge-response test and one or more of the device ID, application ID, and/or OTK. The set of data elements used in computing the verification hash value should match the set of data elements used by the mobile application of the mobile device in computing the response hash value. The verification hash value can be computed in accordance with any of the embodiments described herein. The verification hash value is compared with the response hash value received from the mobile device. If the response hash value does not match the verification hash value, the account request server sends a verification failure indication to the mobile device at block 412, and the verification session terminates. If the response hash value matches the verification hash value, the user is assumed to be a human user, and the request for an online account is fulfilled (e.g., a new online account is created or the user successfully logged into an existing online account). The account request server sends a verification success indication to the mobile device at block 418, and the verification session is terminated.

Exemplary Human Challenge-Response Test Adapted for Mobile Devices

According to embodiments of the present invention, the human challenge-response tests generated by an account request server is adapted to be displayed on mobile devices. Because the display resolution of a mobile devices can be limited, the human challenge-response tests generated by the account request server are intended to allow a user to easily recognize the character string. Unlike convention CAPTCHAs that may distort the character string by compressing, stretching, rotating, and/or bending different portions of the strings in different directions, the human challenge-response tests according to various embodiments are not distorted as such, and the characters in the character string are displayed in proportion to each other. While the display size of the image human challenge-response test may be enlarged or reduced to take advantage of the full display resolution available on a mobile device, the individual characters of the character string are all resized proportionally in the same manner to allow a user to easily recognize the characters.

Although the human challenge-response tests generated by an account request server according to various embodiments are not distorted like conventional CAPTCHAs, various techniques can still be employed to reduce the chances of automated programs, such as optical character recognition programs, from recognizing the solution to the human challenge-response test. Some of these techniques are described below.

Figure 5:
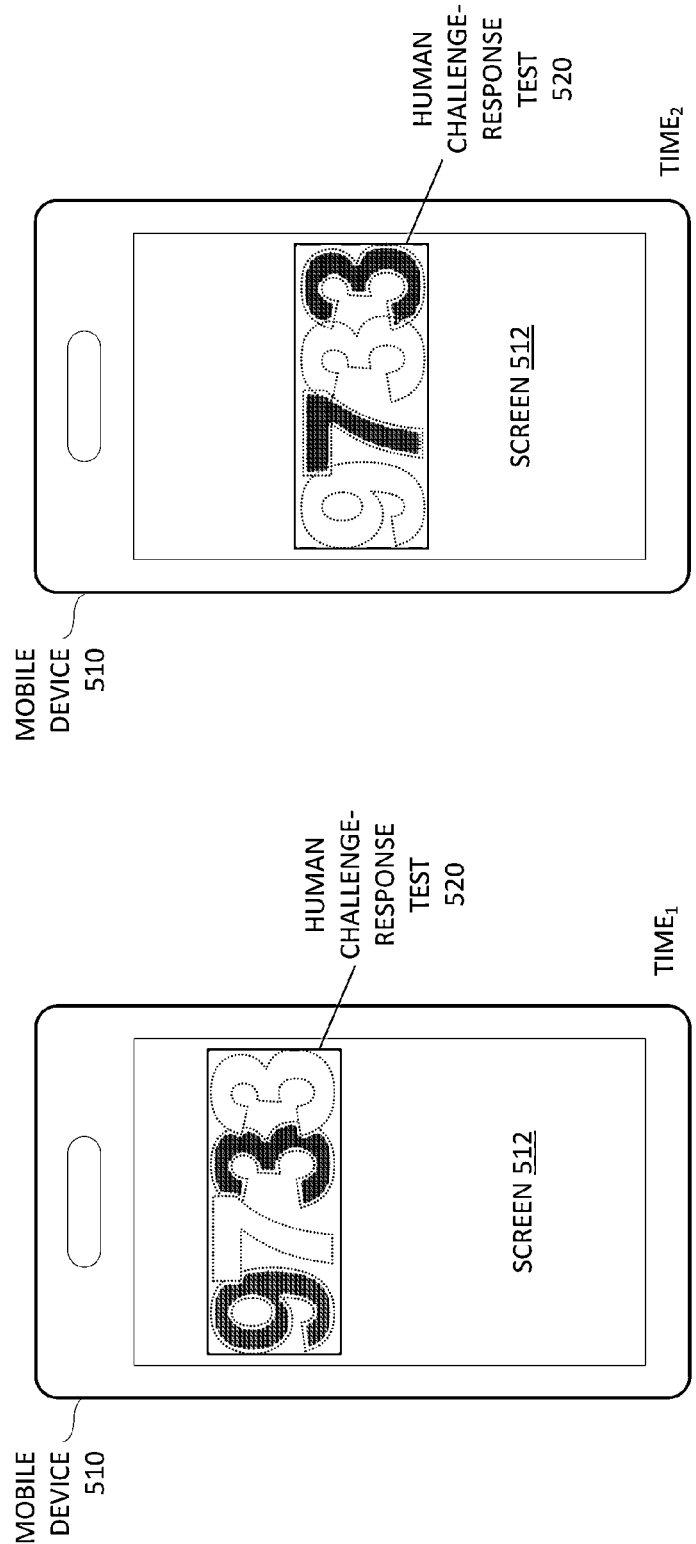
FIG. 5A illustrates an exemplary human challenge-response test being displayed on a mobile device at one point in time, according to various embodiments.
FIG. 5B illustrates an exemplary human challenge-response test being displayed on a mobile device at another point in time, according to various embodiments.

FIGS. 5A and 5B illustrate an exemplary human challenge-response test 520 according to various embodiments of the invention. In the exemplary embodiment shown, the human challenge-response test 520 is an image of four digits or numeric characters that corresponds to a personal identification number (PIN). In other embodiments, the PIN may have one, two, three, four, five, six, or up to ten characters, and any number of digits or characters may be used. However, because the human challenge-response test is expected to be displayed on a screen 512 of a mobile device 510 that may have limited display resolution, the number of characters is expected to be ten characters or less.

In order to prevent an automated program or a machine process from recognizing the PIN, the colors of one or more of the characters may vary with time, and may blend in with a background color to camouflage one or more of the characters at any point in time. For example, the human challenge-response test 520 illustrated in FIGS. 5A and 5B represents the PIN "9733." The human challenge-response test 520 is initially displayed with the characters "7" and the second "3" in a color that is the same color as the background of the image to camouflage the "7" and the second "3" as shown in FIG. 5A. The characters "9" and the first "3" are displayed in a color that contrasts the background of the image such that a user can easily recognize the "9" and the first "3."

At a later point in time as shown in FIG. 5B, the characters "7" and the second "3" are displayed in a color that contrasts the background, while the "9" and the first "3" are now displayed in the same color as the background. This allows the user to easily recognize the "7" and the second "3" at this point in time. The user can then combine the recognized characters at the two points in time together to form the PIN "9733," and enter this number on the mobile device 510 to demonstrate that the user is a human user.

To further prevent the recognition of the PIN by an automated program or a machine process, the position or orientation of the human challenge-response test 520 on the screen 512 can also vary with time. For example, in FIG. 5A, the human challenge-response test 520 is initially displayed towards the upper portion of the screen 512. At a later point in time as shown in FIG. 5B, the human challenge-response test 520 is displayed towards the lower portion of the screen 512. In another embodiment, the human challenge-response test 520 can be rotated or flipped on the screen 512 with time.

In further embodiments, the human challenge-response test is not limited to an image of just numeric characters. For example, a human challenge-response test can be an image of a passcode that includes either numeric characters or alphabetical characters, or both, and may also include symbols and/or special characters. For example, the human challenge-response test can be an image of the passcode "M97A33." In another embodiment, the human challenge-response test can be a simple mathematical question displayed with either words or numbers or both such as "1+1" or "2×3" or "3 plus two," and the correct solution to the human challenge-response test would be the correct mathematical answer to the mathematical question. In some embodiments, the human challenge-response test may also be a simple image of an object such as a cup, a hat, or a dog, and the correct solution to the human challenge-response test would be the word that describes the object. In some embodiments, the human challenge-response test can be a picture of an analog clock, and the correct solution to the human challenge-response test can be the four digit military representation or 12-hour representation of the time shown on the analog clock.

Figure 6:
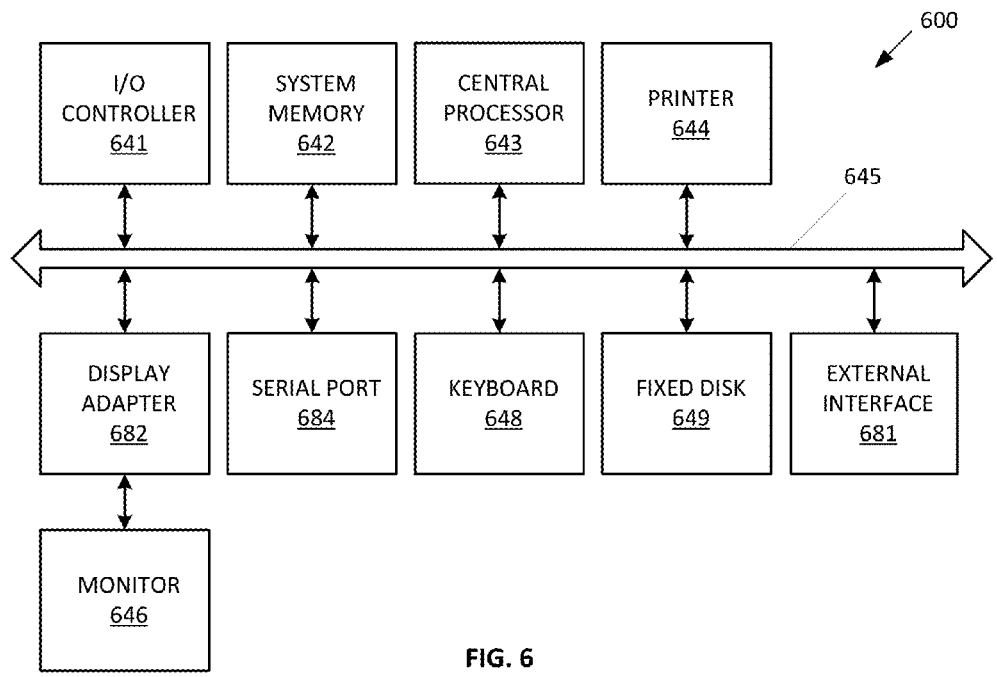
FIG. 6 illustrates a block diagram of an exemplary computer system in which various embodiments can be implemented.

FIG. 6 is a block diagram of a computer system that may be used to implement any of the entities or components (e.g., account request server 120 or 220, or other data processing system, etc.) described above. The subsystems shown in FIG. 6 are interconnected via a system bus 645. Additional subsystems, which may be optional, such as a printer 644, a keyboard 648, a fixed disk 649, a monitor 646 that is coupled to display adapter 682, and others are shown. Peripherals and input/output (I/O) devices, which couple to I/O controller 641, can be connected to the computer system by any number of means known in the art, such as serial port 684. For example, serial port 684 or external interface 681 can be used to connect the computer apparatus to a wide area network such as the Internet, a mouse input device, or a scanner. The interconnection via system bus 645 allows the central processor 643 to communicate with each subsystem and to control the execution of instructions from system memory 642 or the fixed disk 649, as well as the exchange of information between subsystems. The system memory 642 and/or the fixed disk 649 may embody a non-transitory computer readable medium which contains instructions that cause the processor to execute the methods described herein.

Figure 7:
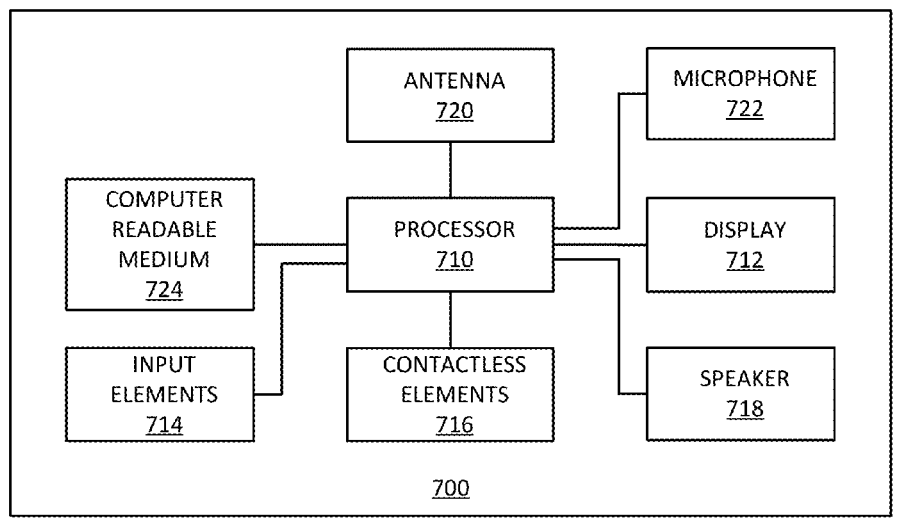
FIG. 7 illustrates a block diagram of an exemplary mobile device in which various embodiments can be implemented.

FIG. 7 shows a block diagram of mobile device 700 that may be used to implement any of the entities or components (e.g., mobile device 110 or 210, or other user devices) described above. Mobile device 700 includes a display 712, an input element 714, computer readable medium 724 such as volatile and non-volatile memory, processor 710 and at least one antenna 720. In addition, mobile device 700 may include a dual interface including both contact (not shown) and contactless interface 716 for transferring information through direct contact or through an integrated chip, which may be coupled to an second antenna. In addition, mobile device 700 may be capable of communicating through a cellular network, such as GSM through antenna 720. Thus, mobile device 700 may be capable of transmitting and receiving information wirelessly through both short range, radio frequency (RF) and cellular connections. The mobile device of FIG. 7 may also include an account identifier associated with an account.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

What is claimed is:

1. A method comprising:
sending, from a user device to a computing device, a request including a device identifier (ID) identifying the user device;
receiving, from the computing device, a request ID and a human challenge-response test to determine whether the request originated from a human user, the request ID being at least one of an application ID or a one-time key generated by the computing device;
receiving, from a user interface of the user device, a user's solution to the human challenge-response test;
sending, to the computing device, the request ID and a response hash value computed over a set of data elements, the set of data elements including the user's solution, and at least one of the device ID or the request ID received from the computing device; and
receiving, from the computing device, an indicator indicating whether the request is permitted,
wherein whether the request is permitted is determined based on at least whether a variable expiration time period associated with the request has lapsed when the response hash value is received by the computing device, the variable expiration time period being set based on at least information received in the request.

2. The method of claim 1, wherein the request is for account access.

3. The method of claim 2, wherein permission for the request determined by using the human challenge-response test requires no more than two communications sent from the user device to the computing device.

4. The method of claim 1, wherein the request further includes at least one of a username or a password.

5. The method of claim 1, wherein the user interface of the user device is one of a keypad, a keyboard, a touch-sensitive panel, a camera, or a microphone.

6. A method comprising:
receiving, from a user device, a request including a device identifier (ID) identifying the user device;

in response to receiving the request from the user device, setting a variable expiration time period for receiving a response hash value from the user device based on at least information received in the request;

generating a request ID and a human challenge-response test to determine whether the request originated from a human user, the request ID being at least one of an application ID or a one-time key;

sending, to the user device, the request ID and the human challenge-response test;

receiving, from the user device, the request ID and the response hash value;

generating a verification hash value based on a correct solution to the human challenge-response test and at least one of the device ID or the request ID; and sending, to the user device, an indicator indicating whether the request is permitted, wherein permission for the request is determined based at least on a comparison of the response hash value and the verification hash value, and whether the variable expiration time period has lapsed when the response hash value is received form the user device.

7. The method of claim 6, wherein the request is for account access.

8. The method of claim 7, further comprising:
storing account credentials of the account in an account database when the response hash value matches the verification hash value.

9. The method of claim 6, further comprising: storing the request ID and the device ID in a temporary storage element; and removing one or more of the request ID or the device ID from the temporary storage element when the expiration time period has lapsed.

10. The method of claim 6, wherein the application ID is generated based at least on application data and the device ID.

11. The method of claim 6, wherein the one-time key is a first character string and the human challenge-response test is an image of a second character string, and the length of first character string of the one-time key is based on the length of the second character string of the human challenge-response test.

12. The method of claim 6, wherein the human challenge-response test is generated based on device capabilities of the user device.

13. A computing device comprising:
at least one processor; and
at least one memory coupled to the at least one processor, the at least one memory storing computer readable code, which when executed by the at least one processor, causes the at least one processor to perform a process for verifying a user for a request, the process comprising:

receiving, from a user device, a request including a device identifier (ID) identifying the user device;

in response to receiving the device ID from the user device, setting a variable expiration time period for receiving a response hash value from the user device based on at least information received in the request;

generating a request ID and a human challenge-response test to determine whether the request originated from a human user, the request ID being at least one of an application ID or a one-time key;

sending, to the user device, the request ID and the human challenge-response test;

receiving, from the user device, the request ID and a response hash value;

generating a verification hash value based on the human challenge-response test and at least one of the device ID or the request ID; and sending, to the user device, an indicator indicating whether the request is permitted, wherein permission for the request is determined based at least on a comparison of the response hash value and the verification hash value, and whether the variable expiration time period has lapsed when the response hash value is received form the user device.

14. The computing device of claim 13, wherein the request is for account access.

15. The computing device of claim 14, wherein the process further comprises:
storing account credentials of the account in an account database when the response hash value matches the verification hash value.

16. The computing device of claim 13, wherein the process further comprises: storing the request ID, the application data, and the device ID in a temporary storage element; and removing one or more of the request ID, the application data, or the device ID from the temporary storage element when the expiration time period has lapsed.

17. The computing device of claim 13, wherein the one-time key is a first character string and the human challenge-response test is an image of a second character string, and the length of first character string of the one-time key is based on the length of the second character string of the human challenge-response test.

18. The computing device of claim 13, wherein the human challenge-response test is generated based on device capabilities of the user device.

* * * * *